(12) United States Patent
Maeda et al.

(10) Patent No.: US 6,231,125 B1
(45) Date of Patent: May 15, 2001

(54) SEAT WITH RESILIENT SHEET-FORMED SEAT CUSHION

(75) Inventors: Minoru Maeda; Isao Kawashima; Tomomi Shoji; Tsutomu Matsuzaki, all of Tochigi-ken; Naohiro Takahashi; Masashi Ishii, both of Saitama; Tsutomu Ao, Saitama, all of (JP)

(73) Assignees: TS Tech Co., Ltd., Saitama-Ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,203

(22) Filed: Dec. 22, 1998

(30) Foreign Application Priority Data

Dec. 26, 1997 (JP) .................................................... 9-368224
Mar. 19, 1998 (JP) ................................................. 10-090915

(51) Int. Cl.⁷ ...................................................... A47C 7/02
(52) U.S. Cl. ................................. 297/452.56; 297/452.55
(58) Field of Search .................... 297/DIG. 2, 452.56, 297/452.55, 451.13

(56) References Cited

U.S. PATENT DOCUMENTS 2,098,456  * 11/1937  Leader et al. .
3,117,819  * 1/1964   Kudriavetz, Jr. .
4,276,666  * 7/1981   Yamada .
4,998,774  * 3/1991   Huff et al. .
5,013,089  * 5/1991   Abu-Isa et al. .
5,100,204  * 3/1992   Makihara et al. .
5,378,040  * 1/1995   Chaney et al. .
5,439,271  * 8/1995   Ryan .
5,533,789    7/1996   McLarty, III et al. .
5,582,463  * 12/1996  Linder et al. .

FOREIGN PATENT DOCUMENTS

1065262  *  1/1984  (SU) ................................ 297/452.56

* cited by examiner

Primary Examiner—Milton Nelson, Jr.
(74) Attorney, Agent, or Firm—Dann, Dorfman, Herrell and Skillman, P.C.

(57) ABSTRACT

A seat is provided which comprises a generally quadrilateral seat frame and a seat cushion formed from a resilient sheet and provided bridging between lateral sides of, and inside, the seat frame. A cushion member is provided opposite to the resilient sheet and bridging between lateral sides of, and inside, the seat frame. The cushion member is deflectable, under the weight of a sitting person, along with the resilient sheet which mainly receives the weight of the sitting person on the seat.

7 Claims, 7 Drawing Sheets

SEAT WITH RESILIENT SHEET-FORMED SEAT CUSHION

BACKGROUND OF THE INVENTION

1. Field of the Invention

The present invention relates to an improved seat having a generally quadrilateral seat frame and a net-like resilient sheet provided bridging between the lateral sides of, and inside, the seat frame to form a seat cushion of the seat.

2. Description of the Prior Art

A seat having a resilient sheet provided bridging between lateral sides of, and inside, a seat frame to form a seat cushion of the seat is well known from, for example, U.S. Pat. Nos. 5,013,089 and 5,553,789 and Japanese Publicized Patent Application No. 8-507935.

The seat has a seat cushion formed from a resilient sheet. Therefore, it is advantageous in that it can be designed to have a different form from ordinary automotive seats, has a good cushioning property and can be formed from a highly permeable seat cushion, pad member and springs may not be specially provided on and in the seat cushion to provide a lightweight design, and can save space very much because of its slim structure.

However, since only the seat cushion is formed from a resilient sheet, the conventional seat is disadvantageous as an automotive seat in that it is heavily vibrated during running of a car, so the driver or passenger cannot stably sit on the seat.

More particularly, the weight of the sitting person is concentrated to under the hip and so he will feel something hard under the hip. In addition, since the resilient sheet forming the seat back will face directly a rear seat. Thus there is a problem that the front seat is influenced by the rear seat, for example, by collision or pushing of the sitting person's knee or the like.

SUMMARY OF THE PRESENT INVENTION

Accordingly, the present invention has an object to overcome the drawbacks of the prior art by providing a seat using a resilient sheet to form a seat cushion which has a good cushioning and a stable holding of a person sitting on a seat.

The above object can be accomplished by providing a seat comprising a generally quadrilateral seat frame and a seat cushion formed from a resilient sheet and provided bridging between lateral sides of, and inside, the seat frame, a cushion member being provided opposite to the resilient sheet and bridging between lateral sides of, and inside, the seat frame, the cushion member being deflectable, under the weight of a sitting person, along with the resilient sheet which mainly receives the weight of the sitting person on the seat.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
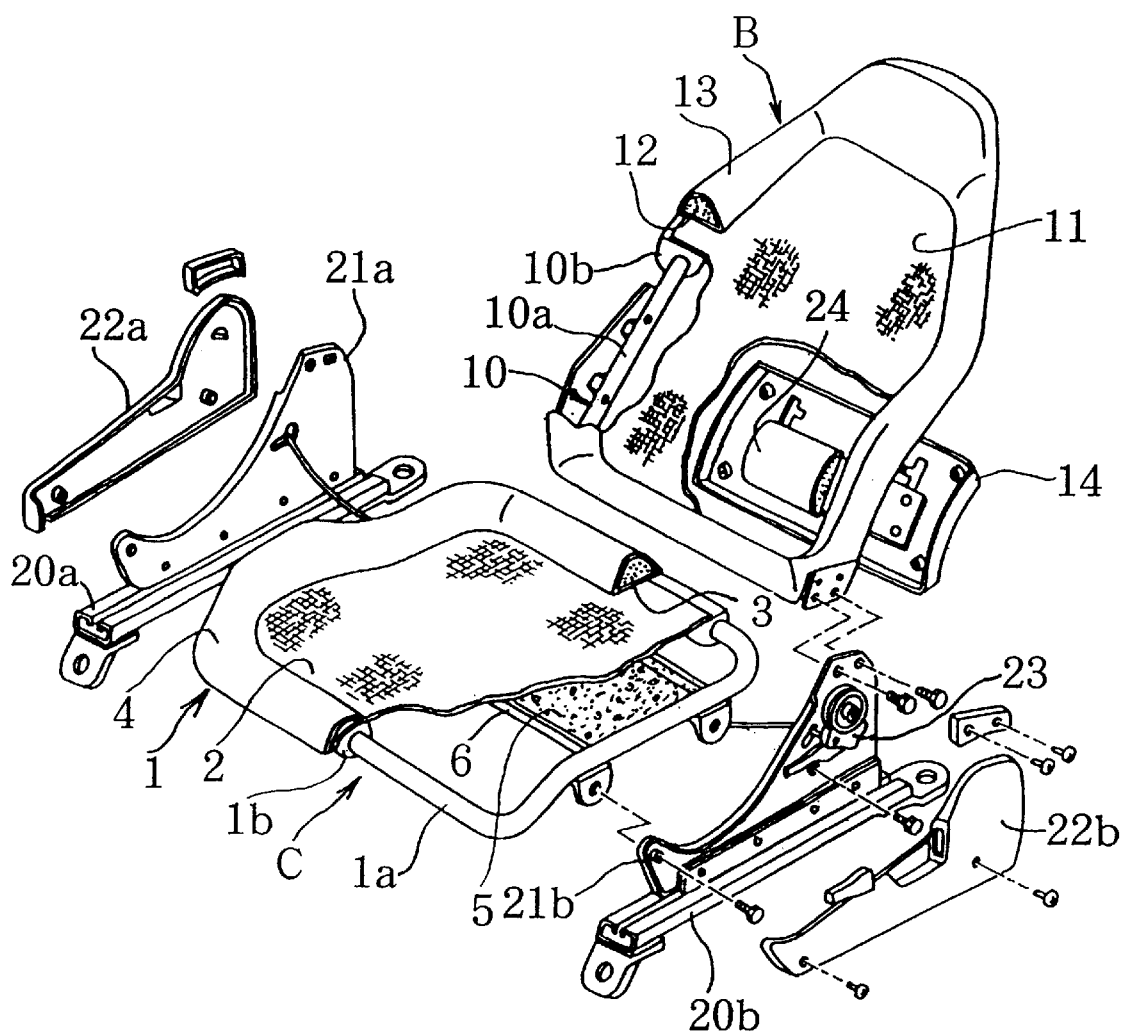
FIG. 1 is an exploded view of an embodiment of the seat cushion formed from a resilient sheet according to the present invention.

Referring now to FIG. 1, there is illustrated an exploded automotive seat which comprises a seat cushion C and a seat back B. The seat cushion C comprises a generally quadrilateral frame 1, a net-like resilient sheet 2 forming a seating portion of a passenger or car driver, pad member 3 forming a bulged edge of the seat cushion itself, a covering member 4 covering the pad member 3, and a cushion member 5 arranged under and provided opposite to the resilient sheet 2. The seat back B comprises a generally quadrilateral frame 10, a net-like resilient sheet 11 forming a backrest portion of the passenger, pad member 12 forming a bulged edge of the seat back itself, a covering member 13 covering the pad member 12, and a cushion member 14 arranged in back of and provided opposite to the resilient sheet 11.

Figure 2:
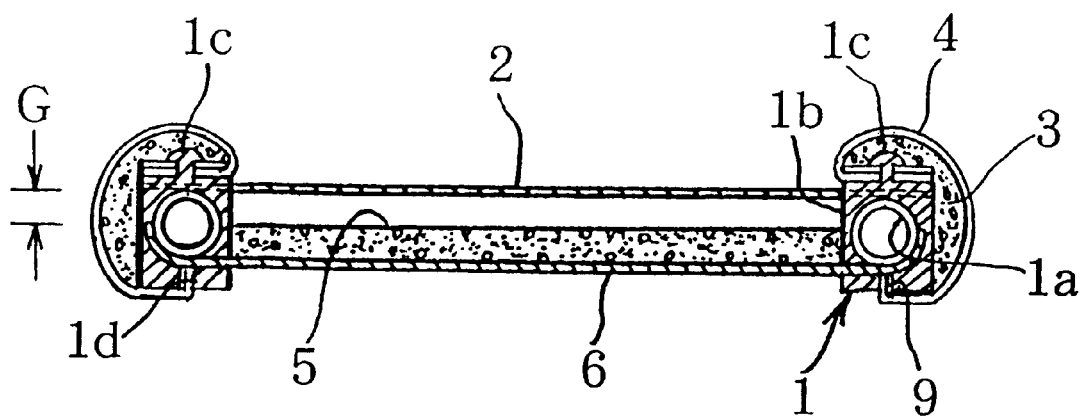
FIG. 2 is a sectional view, from the front, of the seat cushion of the seat in FIG, 1.

First, the basic construction of the seat cushion C will be described below. As shown in FIG. 2, the seat cushion C comprises the quadrilateral frame 1 which consists of a metallic pipe frame 1a and a resin-made frame 1b injection-molded along with the pipe frame 1a.

The pipe frame 1a has the generally quadrilateral form whose each side is bent in conformity to the sitting posture of the passenger. The resin frame 1b is made of a synthetic resin such as polyethylene terephthalate, polypropylene or polyethylene.

The resilient sheet 2 is made of an elastic, highly permeable cloth including, for example, a union cloth used as interior textile and formed from plural kinds of elastomer monofilaments woven with plural kinds of strands formed from fibrous yarns or a woven fabric or knit fabric formed from elastomer monofilaments of 1,000 to 4,000 deniers woven or knitted with respect to warps or wefts to impart an elasticity and permeability to the knit fabric.

The resilient sheet 2 is appropriately tensed by pulling from the front and rear ends thereof with clamps or the like, and put in a mold. The metallic pipe frame 1b is also put into the same mold and then a material for the resin frame 1b is injected into the mold. Thus, the resilient sheet 2 is embedded at the front and rear end portions thereof in the resin frame 1b. The resilient sheet 2 is thus tensed in and on the seat cushion frame 1.

The pad member 3 is formed from a foamed urethane along the front, lateral and rear of the seat cushion frame 1. It is shaped to have a predetermined cross-sectional form. The pad member 3 may be formed on each of the sides of the seat cushion frame 1 or continuously along the entire profile of the seat cushion frame 1.

The covering member 4 may be any of general-purpose natural leather, synthetic leather, fabric, etc. As shown, the covering member 4 wraps the pad member or members 3 from outside along the seat cushion frame 1 and may be secured by sewing. The covering member 4 thus used has a generally C-shaped cross section open at the inner portion thereof.

The cushion member 5 is formed from a cushion foam having a perpendicular compressive resilience such as urethane foam or polyester fibers. A pan-shaped bracket plate 6 is provided bridging between the lateral sides of, and inside, the pipe frame 1a. The cushion member 5 is disposed on the upper side of the bracket plate 6 in opposite to the resilient sheet 2. The resilient sheet 2 and cushion member 5 are spaced a distance G from each other.

When deflected downward under the weight of a person sitting on the seat, the resilient sheet 2 is received by the cushion member 5. Since the cushion member 5 provides a sufficient cushioning when perpendicularly applied with a weight, the sitting person will not feel any hard thing under his hip but he can sit stably and comfortably. To maintain the space G between the resilient sheet 2 and cushion member 5, the deflection of the resilient sheet 2 when the person sits on the seat can be appropriately adjusted. Also, the weight of a sitting person of a medium build is normally supported on the resilient sheet 2 and the weight of a heavy person can be supported on the combination of the resilient sheet 2 and cushion member 5. Namely, the seat cushion may be designed to have a two-step cushion structure.

Figure 3:
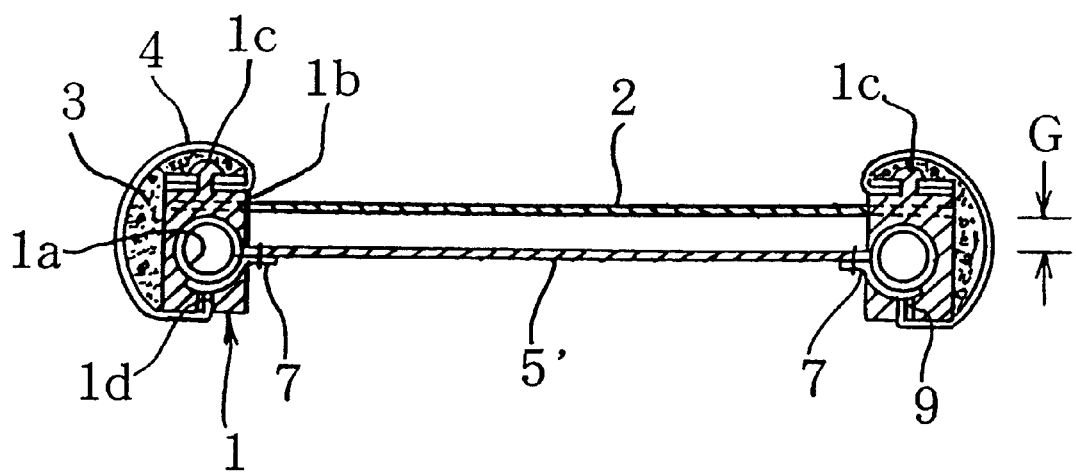
FIG. 3 is a sectional view, from the front, of a variant of seat cushion having a different structure from that shown in FIG. 2.

In lieu of the cushion member 5 constructed as discussed above, there may be employed a cushion member 5' which is formed of a rubber sheet as shown in FIG. 3. In this case, retaining projections 7 are formed integrally on the surfaces of the pipe frame 1a, and the cushion member 5' is secured along the lateral end portions thereof on the projections 7. The cushion member 5' is located below the resilient sheet 2 and deflects along with the latter when a heavy person sits on the seat.

There should preferably be maintained the space G between the resilient sheet 2 and cushion member 5' also in this case. As the resilient sheet 2 is deflected under the weight of a sitting person, the cushion member 5' will also deflect. This combination of the resilient sheet 2 and cushion member 5' will provide a good sitting comfort. A person will not feel anything hard under the hip when sitting on the seat.

Figure 4:
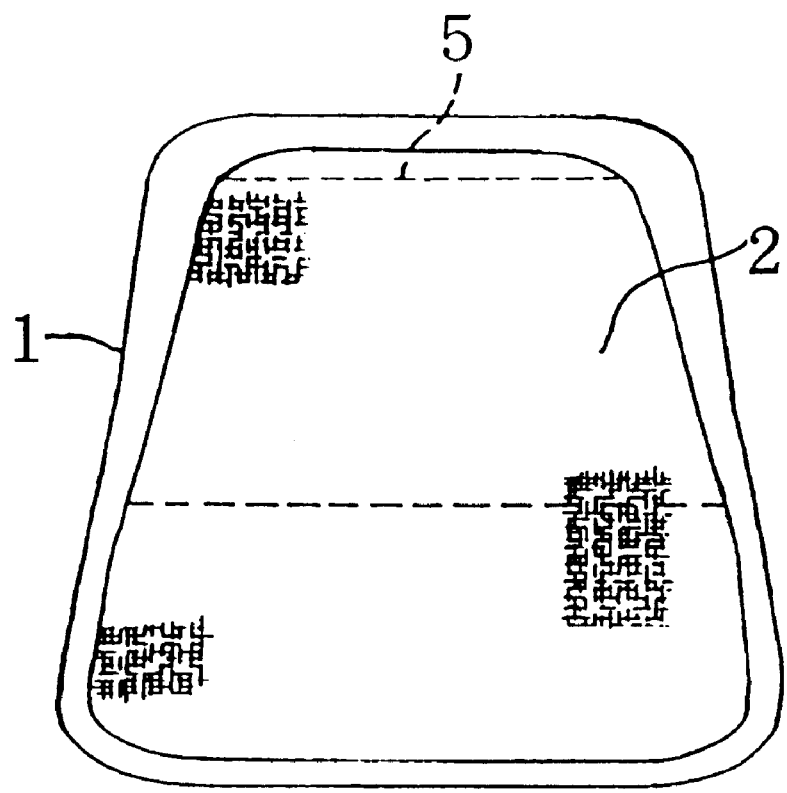
FIG. 4 is a plan view of the seat cushion in FIG. 1.

Referring now to FIG. 4, the cushion member 5(5') extends to the rear side of the seat cushion C from approximately a half of the seat cushion C, wherein the weight of a sitting person will concentrate. Owing to this configuration of the seat cushion C, most of the weight of a sitting person can be stably received or supported on the combination of the cushion member 5(5') and resilient sheet 2 both showing a good elasticity and resilience. Also, thanks to the permeability of the front half of the resilient sheet 2 that is not backed by the cushion member 5(5'), air is allowed to smoothly flow through the resilient sheet 2 from the floor.

Figure 5:
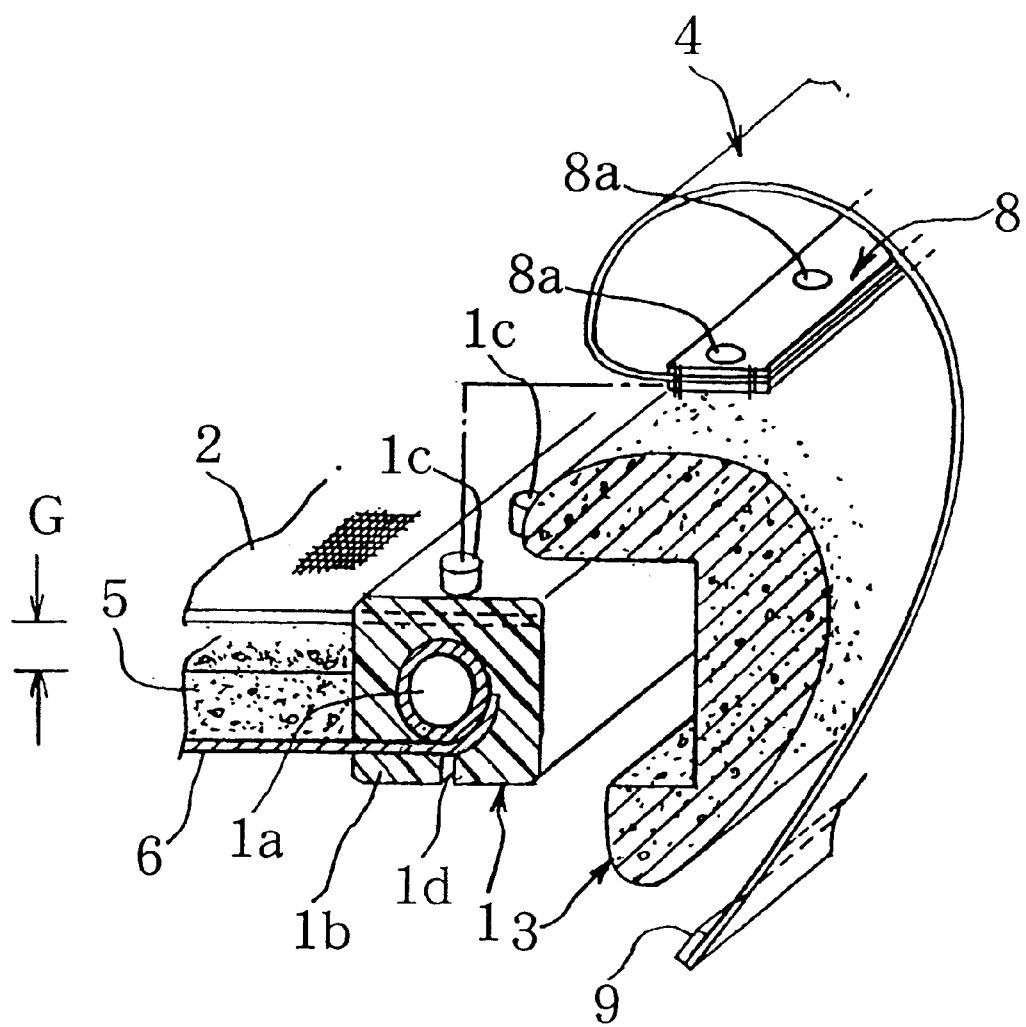
FIG. 5 is a fragmentary sectional view, partially exploded, of the seat cushion in FIG. 1.

Referring to FIG. 5, the covering member 4 has sewn to one end portion thereof a plate 8 made of a polypropylene or polyethylene and having a plurality of punched holes 8a formed at predetermined intervals therein. Further, the resin frame 1b of the sheet cushion frame 1 has formed on the front side thereof a plurality of projections 1c. The projections 1c fitted in the punched holes 8a of the resin plate 8.

The resin plate 8 of the covering member 4 is applied to the front side of the resin frame 1b with the projections 1c being fitted into the punched holes 8a. The ends of the projections 1c are caulked by ultrasonic welding, thermal welding, collapsing or otherwise to secure the end of the covering 4 to the resin frame 1b.

The other end of the covering member 4 is wound around the bottom of the seat cushion frame 1 and secured by tacking or otherwise. Alternatively, a retaining recess 1d may be formed in the resin frame 1b along the central axis of the frame 1b, and a retaining plate 9 is provided at the other end of the covering member 4. The other end of the covering member 4 is secured to the frame 1b by causing the resin plate 9 to be forcibly fitted into the recess 1d. The pad member 3 is placed inside the covering member 4 and fitted on the seat cushion frame 1 before the retaining resin plate 9 of the covering member is retained in the recess 1d. After the other end of the covering member 4 is secured in the recess 1d as in the above, the pad member 3 can be wrapped in place inside the covering member 4.

The resilient sheet 2 disposed by bridging between the front and rear sides of, and inside, the seat cushion frame 1 provides a seat cushion body having a suitable resilience, and also the covering member 4 wrapping the pad member 3 as mentioned above provides a bulge formed along the perimeter of the seat cushion body except for the front side and higher than the plane of the seat cushion body formed by the resilient sheet 2. A person sitting on the seat cushion C can be well held by the bulged perimeter of the seat cushion. Furthermore, the cushion member 5(5') will enhances the cushioning and sitting comfort of the resilient sheet 2.

Figure 6:
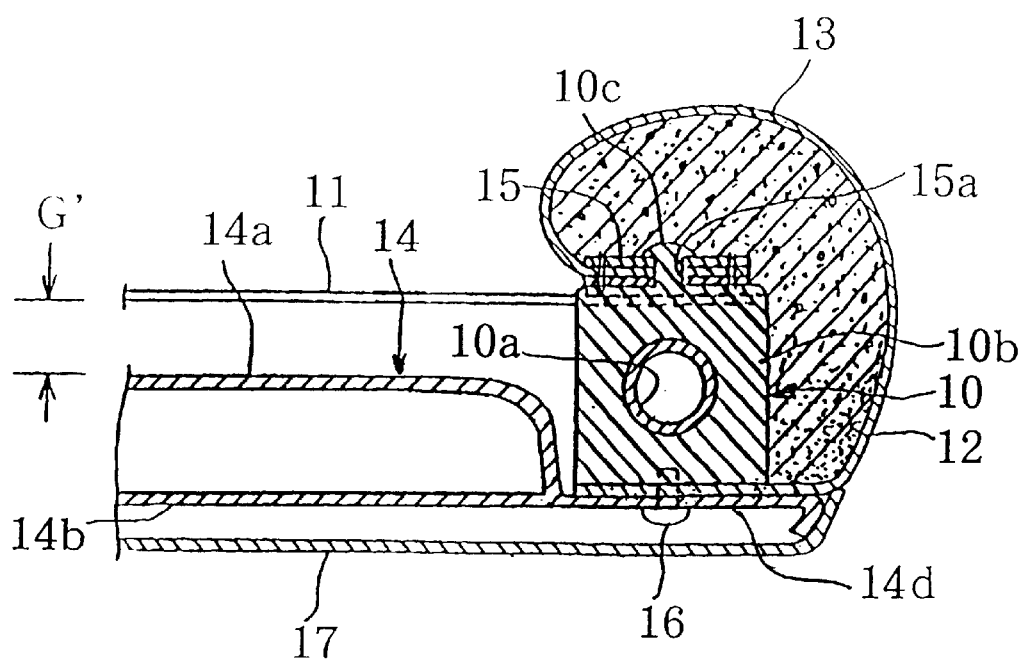
FIG. 6 is a partial sectional view of the seat back of the seat in FIG. 1.

Referring to FIG. 6, there is illustrated the seat back B. The seat back B is assembled in the same manner as the seat cushion C is done. The pad member 12 which is assembled to the frame 10 of the seat back B is largely bulged along the lower portion below the middle of the frame height and also along the upper portion of the frame 10. A portion of the pad member 12 which positionally corresponds to the upper portion of the frame 10 serves as a headrest. Such pad member 12 will provide a bulged edge of the seat back B to well hold a person sitting on the seat cushion and leaning on the seat back.

Figure 7:
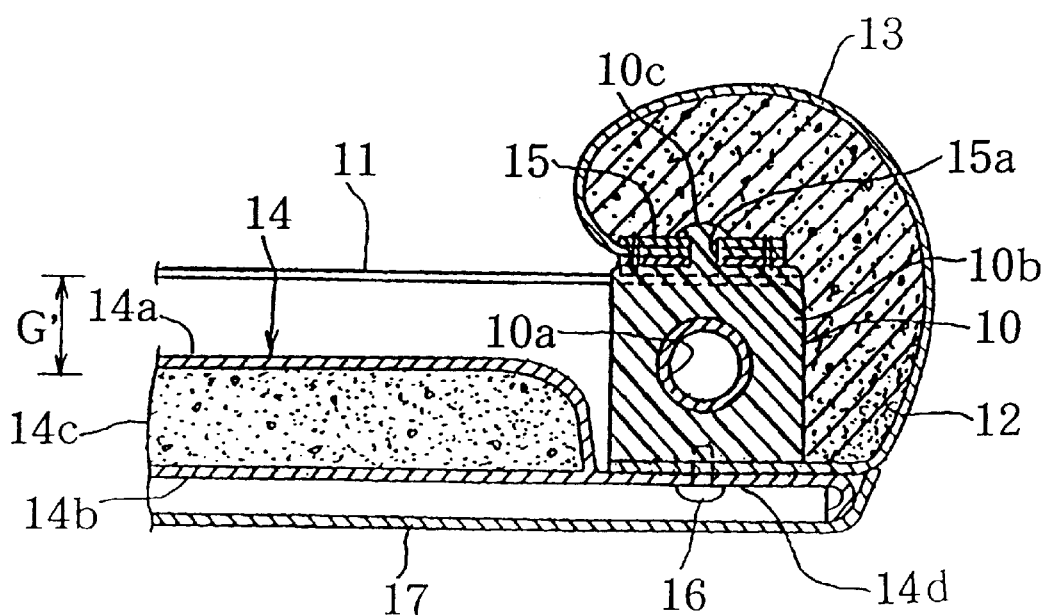
FIG. 7 is a partial sectional view of a variant of seat back having a different structure from that in FIG. 9.

The cushion member 14 is employed as a seat back body. The cushion member 14 may be formed hollow by blow molding and comprises a front portion 14a made of a soft synthetic resin and disposed with a space G' from the resilient sheet 11 which can be deflected, and a rear portion 14b made of a hard synthetic resin. Referring to FIG. 7, the cushion member 14 may have a foamed cushion layer 14c between the front portion 14a made of a soft synthetic resin and the rear portion 14b made of a hard synthetic resin. The foamed cushion layer 14c is formed integrally between the front and rear portions 14a and 14c when the cushion member 14 is formed by blow molding.

The soft synthetic resin for the front portion 14a of the cushion member 14 and the hard synthetic resin for the rear portion 14b of the cushion member 14 may be prepared by mixing a thermoplastic elastomer (TPE), polyvinyl chloride (PVC), etc. at appropriate ratios.

Again referring to FIGS. 6 and 7, the covering member 13 for the pad member 12 has a resin plate 15 provided at one end thereof and the frame 10 comprises a metallic pipe frame 10a and a resin frame 10b injection-molded along with the pipe frame 10a. The resin frame 10b has projections 10c formed thereon. The resin plate 15 of the covering member 14 has punched holes 15a formed thereon. The one end of the covering member 13 is attached to the resin frame 10*b* by causing the punched holes 15*a* to receive the projections 10*c* and causing the upper ends of the projections 10*c* to be caulked by ultrasonic welding, thermal welding, collapsing or other technique. The pad member 12 is placed between the covering member 13 and the frame 10, wrapped with the covering member 13, and retained between the frame 10 and the covering member 13 by causing the other end of the covering member 13 to be secured to a back side of the frame 10 together with a flange portion 14*d* of the cushion member 14 by a fastener 16 such as a tapping screw or anchor bolt.

In the seat back B constructed as described above, the seat back B has cushioning properties, the resilient sheet 11 is highly permeable, and the covering 13 wrapping the pad member 12 forms a bulged perimeter projecting much more forwardly than the seat back surface formed from the resilient sheet 11. This assembling is similar to that of the seat cushion. Thus, a sitting person can be stably held on the seat and the seat itself can be assembled rigidly.

Since there is provided behind the resilient sheet 11 constituting the backrest portion of the passenger the cushion member 14 spaced from the resilient sheet 11 a distance G', the seat back B can provide good cushioning properties, thereby to support a sitting person stably and comfortably. Also he will not feel anything hard at the back.

The rear portion 14*b* of the cushion member 14 is formed from a hard synthetic resin, so that even if a loading or pushing is applied to the rear portion 14*b* of the cushion member 14 by the knee of a person sitting on a rear seat, for example, the loading will not have any direct affect on the front portion 14*a* of the cushion member 14. Namely, the rear portion 14*b* will enhance the rigidity of the front seat against such a loading applied from the rear seat.

The cushion member 14 may be attached to the frame 10 in a manner to cover approximately the lower half of the frame 10 at the rear side of the frame 10.

Figure 8:
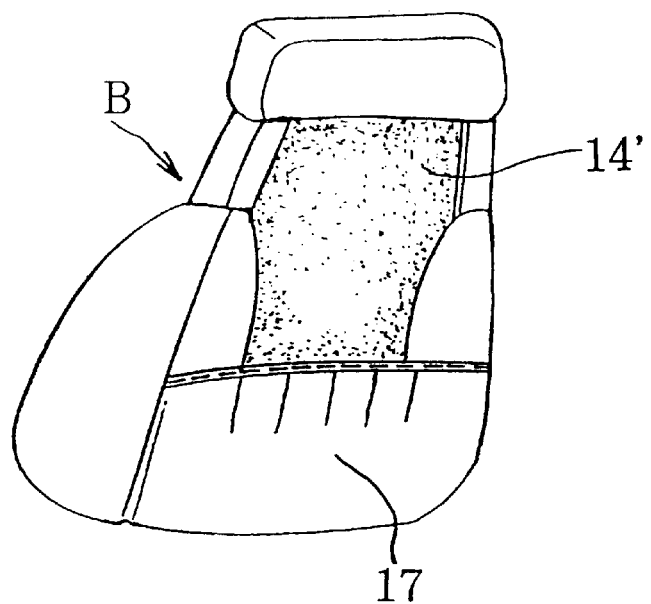
FIG. 8 is a perspective view, from the back, of the seat back of the seat in FIG. 1.

To avoid a direct action on the front seat of a loading, such as pushing by the sitting person's knee, from the rear seat as well as to reinforce the seat against any shock or loading from the rear seat, there may be employed a board-shaped cushion member which is formed by injection molding from a synthetic resin such as polyethylene terephthalate, polypropylene, polyethylene or the like. As shown in FIG. 8, the board-shaped cushion member 14' covers the entire back of the seat back from behind the resilient sheet 11 and is disposed with a space G' from the resilient sheet 11 which can be deflected.

Figure 9:
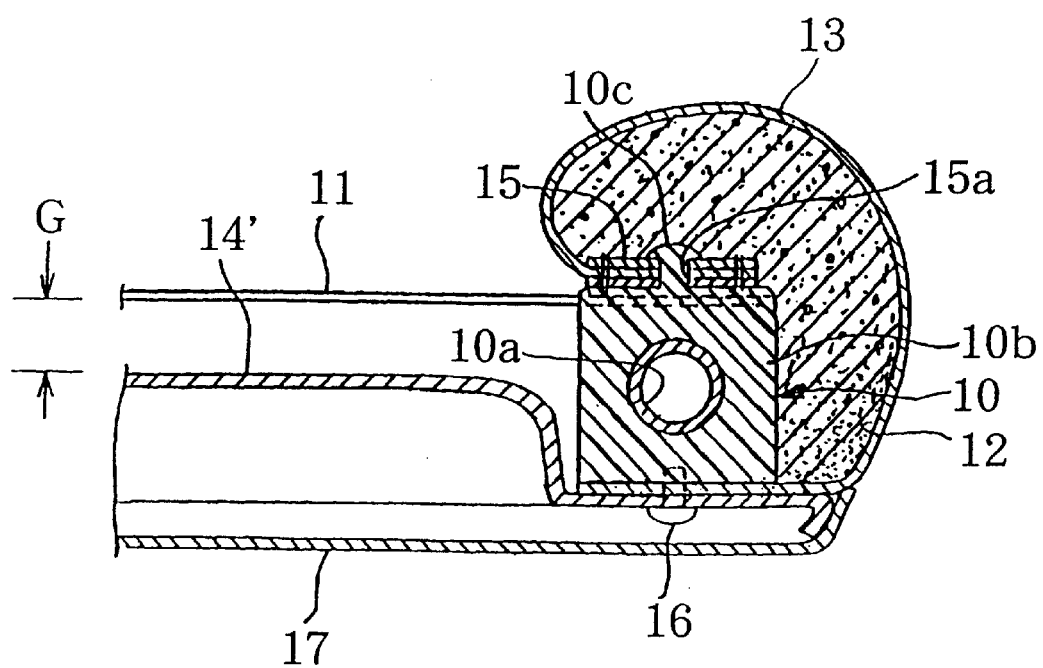
FIG. 9 is a partial sectional view of a variant of seat back having a different structure from those in FIGS. 6 and 7, provided with a cover which softly receives the knee of a passenger on the rear sheet and imparts a rigidity to the seat back.

As shown in FIGS. 8 and 9, a back pocket 17 may be provided at the back of the cushion member 14' of the seat back B so that the cushion member 14' can be effectively used to store or receive some articles. The back pocket 17 may be formed from a net or any other type of covering and fixed around the flange portion of the cushion member 14'. Thus, the back pocket 17 is integrally provided on the seat back B not to interfere with or annoy sitting person on the rear seat.

In the embodiment having been described in the foregoing, the seat according to the present invention uses the seat frames 1 and 10 incorporating the metallic pipe frames 1*a* and 10*a* on which the resin frames 1*b* and 10*b* are formed integrally, respectively. In the seat back B shown in FIG. 10, there may be employed a seat frame 10' which is formed from a metallic frame having a generally C-shaped cross section open inside the frame. Such seat frame may be also employed for the seat cushion C.

Figure 10:
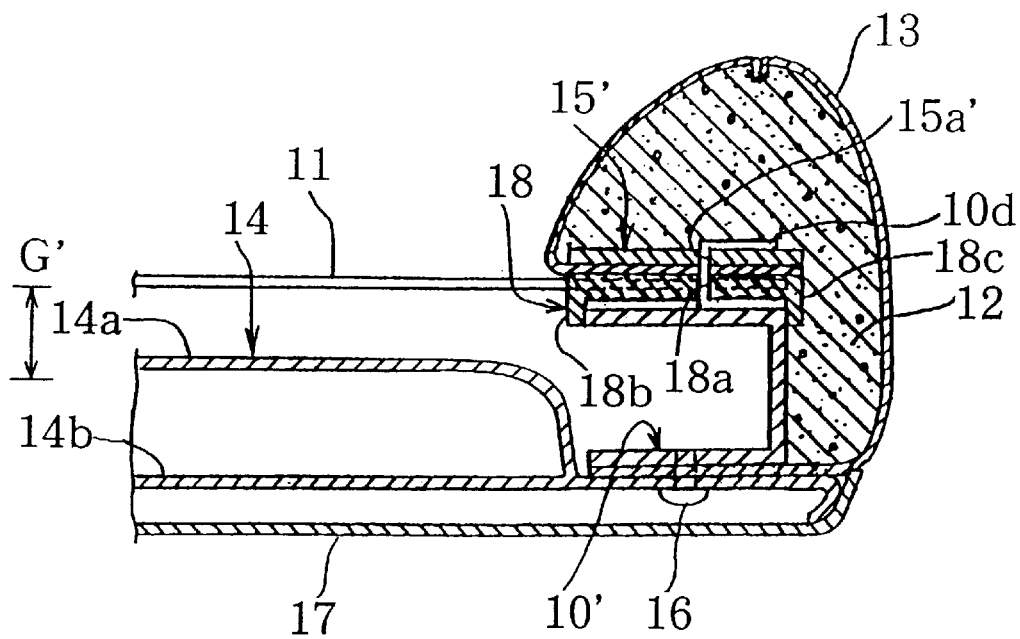
FIG. 10 is a partial sectional view of a variant of seat back having a different structure from those in FIGS. 6 and 7.

In the event that the seat frame 10' is employed, a resin plate 18 is provided around the peripheral end of the resilient sheet 11. The resin plate 18 is made from polyethylene terephthalate (PET), polypropylene (PP) or the like by injection molding. As shown in FIG. 10, the resin plate 18 has a substantially inverted U-shaped body which comprises a pair of spaced apart rising sections 18*b*, 18*c* and a base plate section interconnecting the spaced apart rising sections 18*b*, 18*c*. When the resin plate 18 is formed by the injection molding, the peripheral end of the resilient sheet 11 is simultaneously embedded in the base plate section 18*a*. Thus, the resilient sheet 11 is supported to the resin plate 18 and tensioned at the peripheral end of the resilient sheet 11 by the resin plate 18. The resin plate 18 has a plurality of slits 18*a* formed in the base plate section thereof and arranged along the length of the base plate section. Bearing on this, the seat frame 10' has latching pawls 10*d* as retainers welded at a plurality of regularly spaced positions of a surface thereof. The resin plate 18 having the resilient sheet 11 supported thereto is mounted on the seat frame 10' with the spaced apart rising sections 18*b*, 18*c* engaging both sided of the seat frame 10' and with the slits 18*a* receiving the latching pawls 10*d* of the seat frame 10'. As shown in FIG. 10, the covering 13 has a reinforcing cord 15', such as a trimming cord, attached to the end portion thereof. Reference numeral 15*a*' in FIG. 10 denotes slit (only one slit 15*a*' is shown in FIG. 10) which extend through the reinforcing cord 15' and the end portion of the covering 13. The reinforcing cord 15' is placed on the base plate section of the resin plate 18 and is secured to the resin plate 18 mounted on the seat frame 10'. More particularly, the end portions of the latching pawls 10*d* which project upwardly from the resin plate 18 through the slits 18*a* of the resin plate 18 are inserted through the slits 15*a*' and bent over the surface of reinforcing cord 15', whereby the seat frame 10', the resin plate 18 and the covering 13 having the reinforcing cord 15' are integrally connected to one another.

Figure 11:
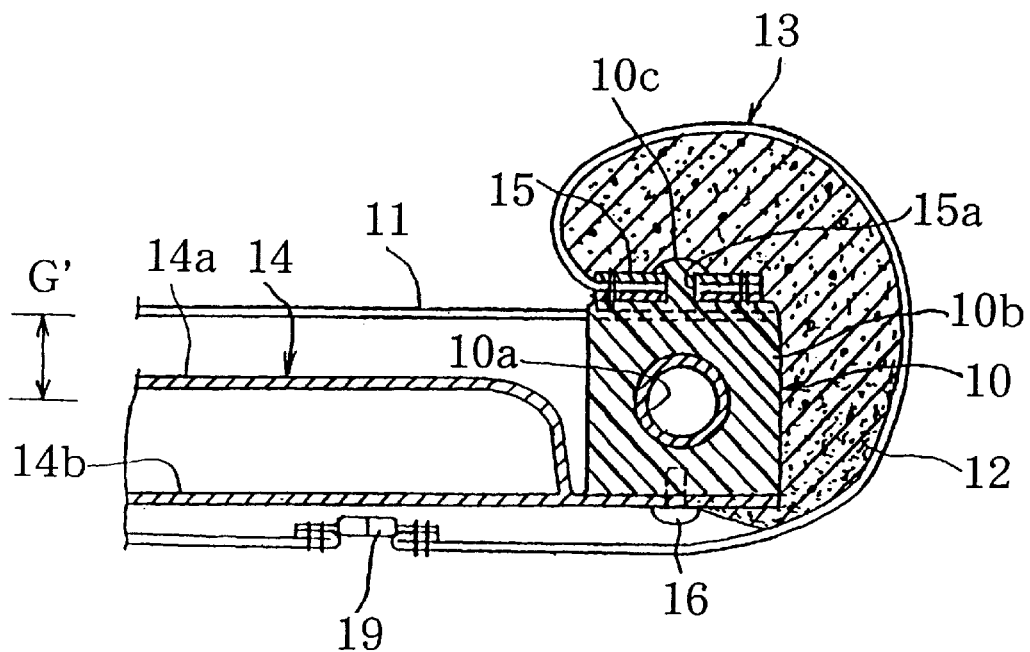
FIG. 11 is a partial sectional view of a variant of seat back having a different structure from those in FIGS. 6, 7 and 10.

Referring to FIG. 11, there is a seat back which is similar to that of FIG. 6 except that the seat back does not have a back pocket. In the seat back of FIG. 11, a covering 13 is openable with a sliding fastener 19 to expose the back of the seat back.

Again referring to FIG. 1, bracket plates 21*a* and 21*b* are slidably supported to slide rails 20*a* and 20*b*, respectively. The seat cushion C is supported to the bracket plates 21*a*, 21*b*, so that the seat cushion C can be forwardly and rearwardly slid along the slide rails 20*a*, 20*b* in the same manner as an ordinary seat cushion is done. The bracket plates 21*a* and 21*b* are covered with outer coverings 22*a* and 22*b*, respectively. In the seat cushion C, a reclining mechanism 23 may be provided at one 21*b* of the bracket plates, so that the seat may be used as a recliner. Also, a lumber support 24 may be provided movably up and down in the seat back B.

As having been described in the foregoing, the seat according to the present invention has the resilient sheet and cushion member which are provided opposite to each other with the space between them, the space being sufficiently large for the resilient sheet to be deflectable when receiving the weight of a sitting person. Therefore, according to the present invention, there is provided a seat in which the cushioning of the resilient sheet and the appropriate cushioning of the cushion member work to attain a stable holding and good sitting comfort or a person. Also, the cushion member of the back seat prevents the loading such as pushing of the sitting person's knee from affecting directly the front seat and also enhances the rigidity of the seat against such loading from the rear seat.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A seat comprising:

a seat cushion having a first seat frame, a first resilient sheet of netting supported by said first seat frame to form a seating surface for a person, and a first cushion member disposed under said resilient sheet and spaced apart therefrom at a first predetermined distance; and a seat back having a second seat frame, a second resilient sheet of netting supported by said second seat frame to form a backrest portion for the person, and a second cushion member disposed behind said second resilient sheet and spaced apart therefrom at a second predetermined distance.

2. The seat according to claim 1, wherein said first cushion member is positioned under a portion of the first resilient sheet of netting, where the weight of the person sitting on said seat cushion would be concentrated.

3. The seat according to claim 1 or 2, wherein said second cushion member is positioned under a portion of the second resilient sheet of netting, where the weight of the person resting on said seat back would be concentrated.

4. The seat according to claim 1 or 2, wherein said seat cushion comprises a bracket plate supported by said first seat frame, and said first cushion member comprises a cushioning foam disposed on said bracket plate.

5. The seat according to claim 1 or 2, wherein said first cushion member is formed from a rubber sheet.

6. The seat according to claim 1 or 2, wherein said second cushion member comprises a hollow blow-molded body having a deflectable front portion made of a soft synthetic resin and a rigid rear portion formed from a hard resin.

7. The seat according to claim 1 or 2, wherein said second cushion member comprises a hollow blow-molded body having a deflectable front portion made of a soft synthetic resin, a rigid rear portion formed from a hard resin, and a cavity containing a cushioning foam.

* * * * *